J. M. SWANSTROM.
DEVICE FOR RAISING WATER.
APPLICATION FILED SEPT. 24, 1909.
979,107.
Patented Dec. 20, 1910.
6 SHEETS—SHEET 1.
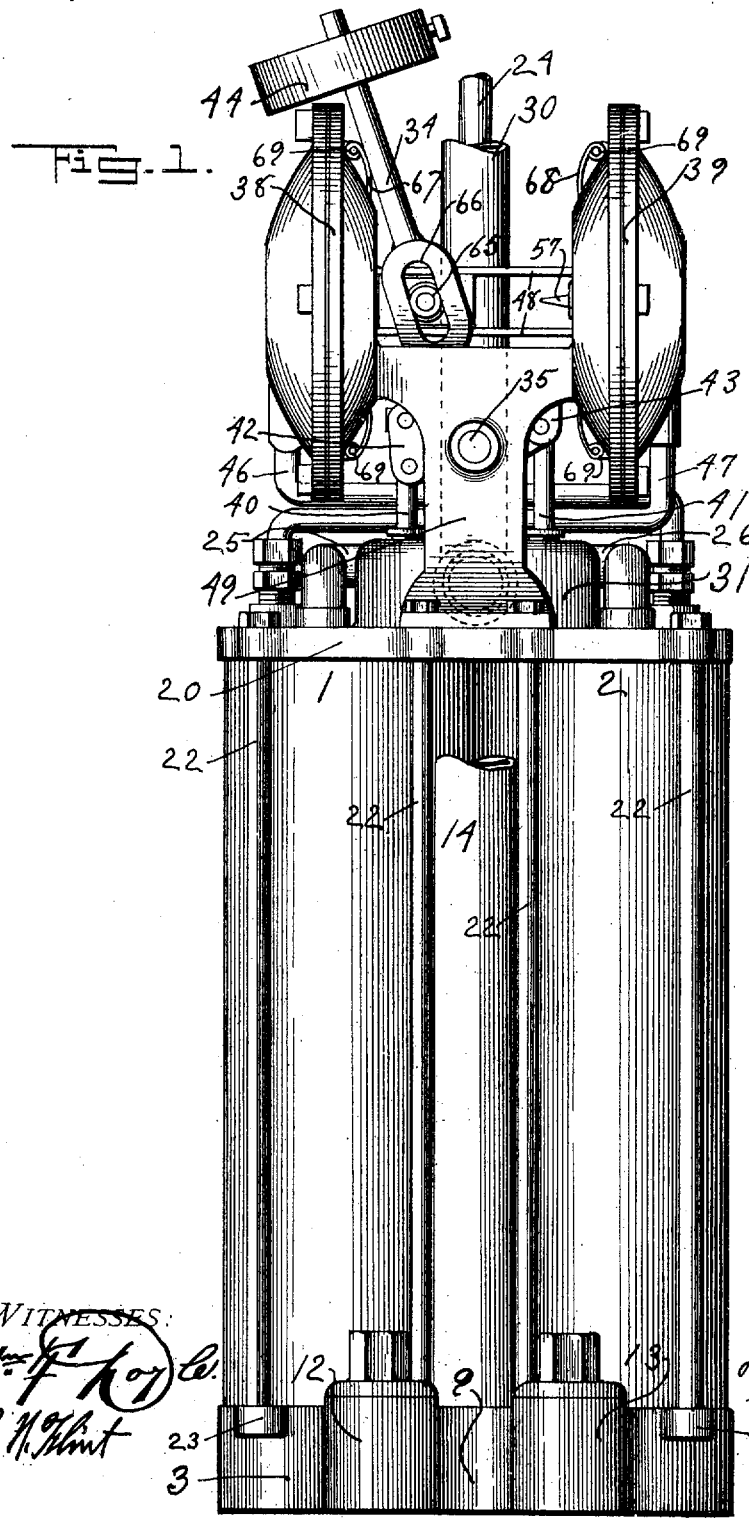

J. M. SWANSTROM.
DEVICE FOR RAISING WATER.
APPLICATION FILED SEPT. 24, 1909.
979,107.
Patented Dec. 20, 1910.
6 SHEETS—SHEET 2.
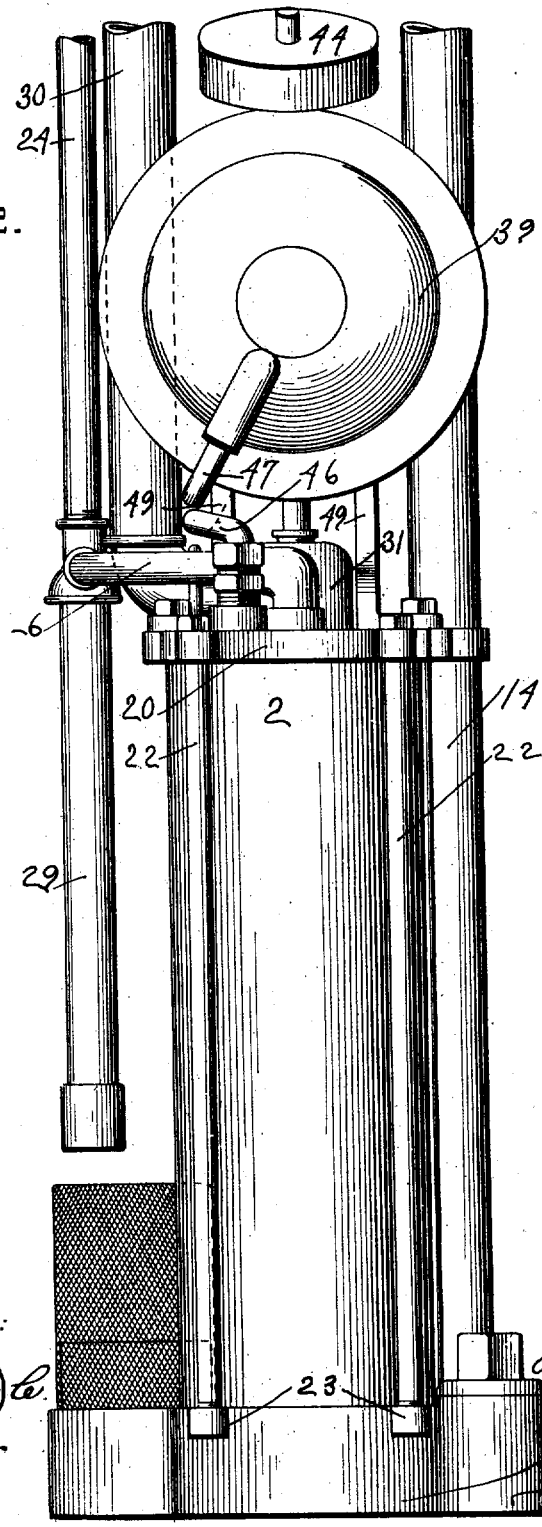
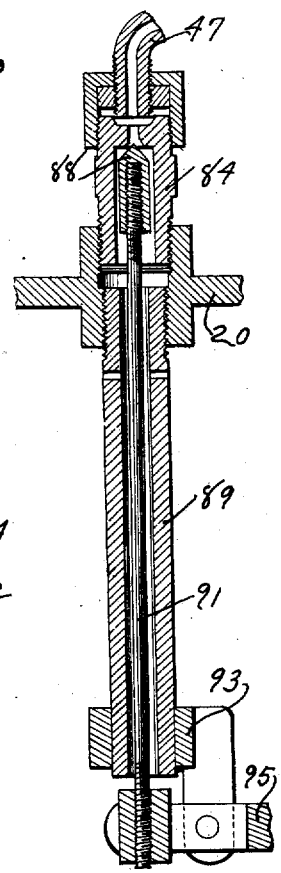
WITNESSES:
INVENTOR
John M. Swanstrom
Attorney

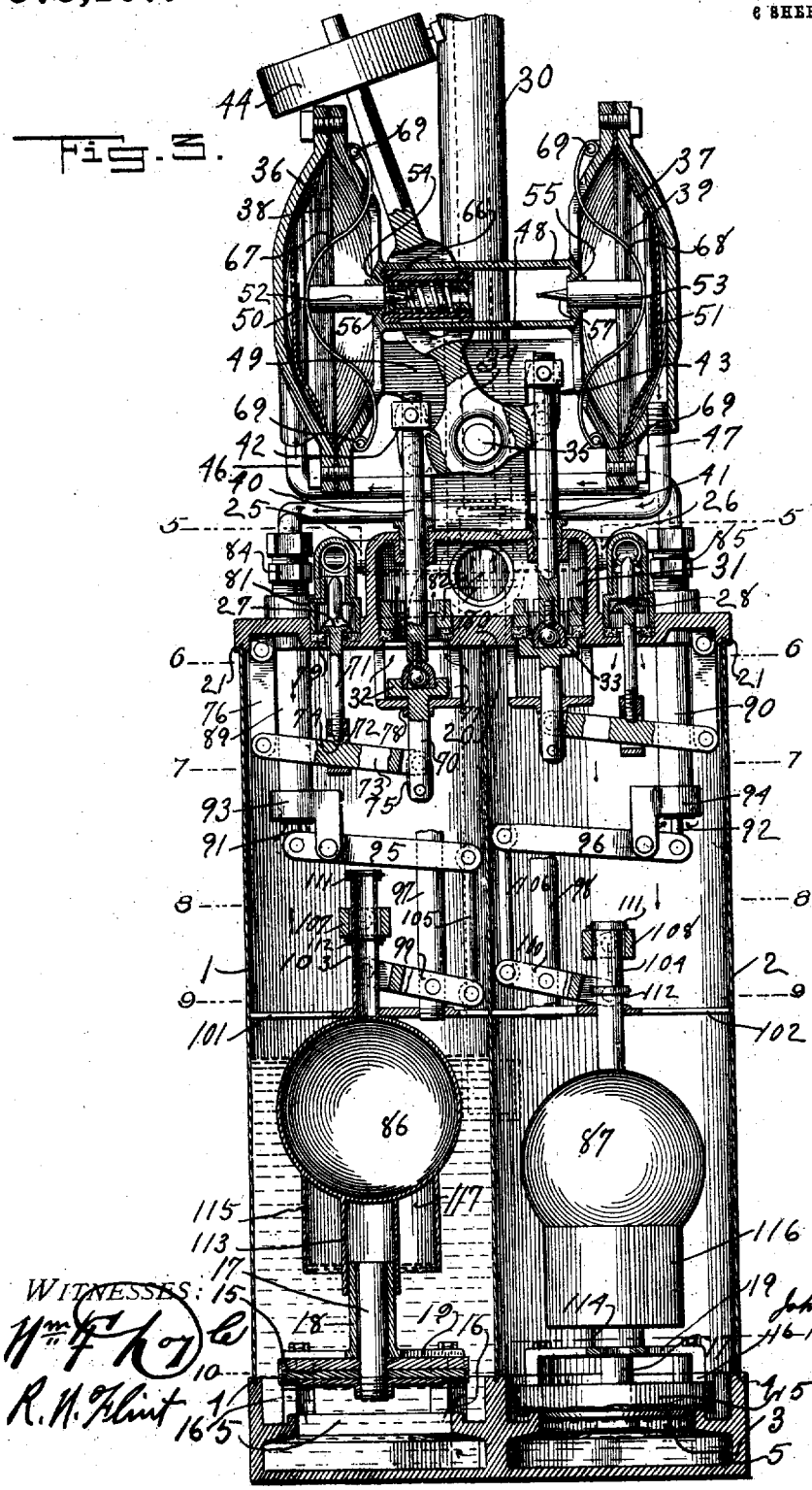

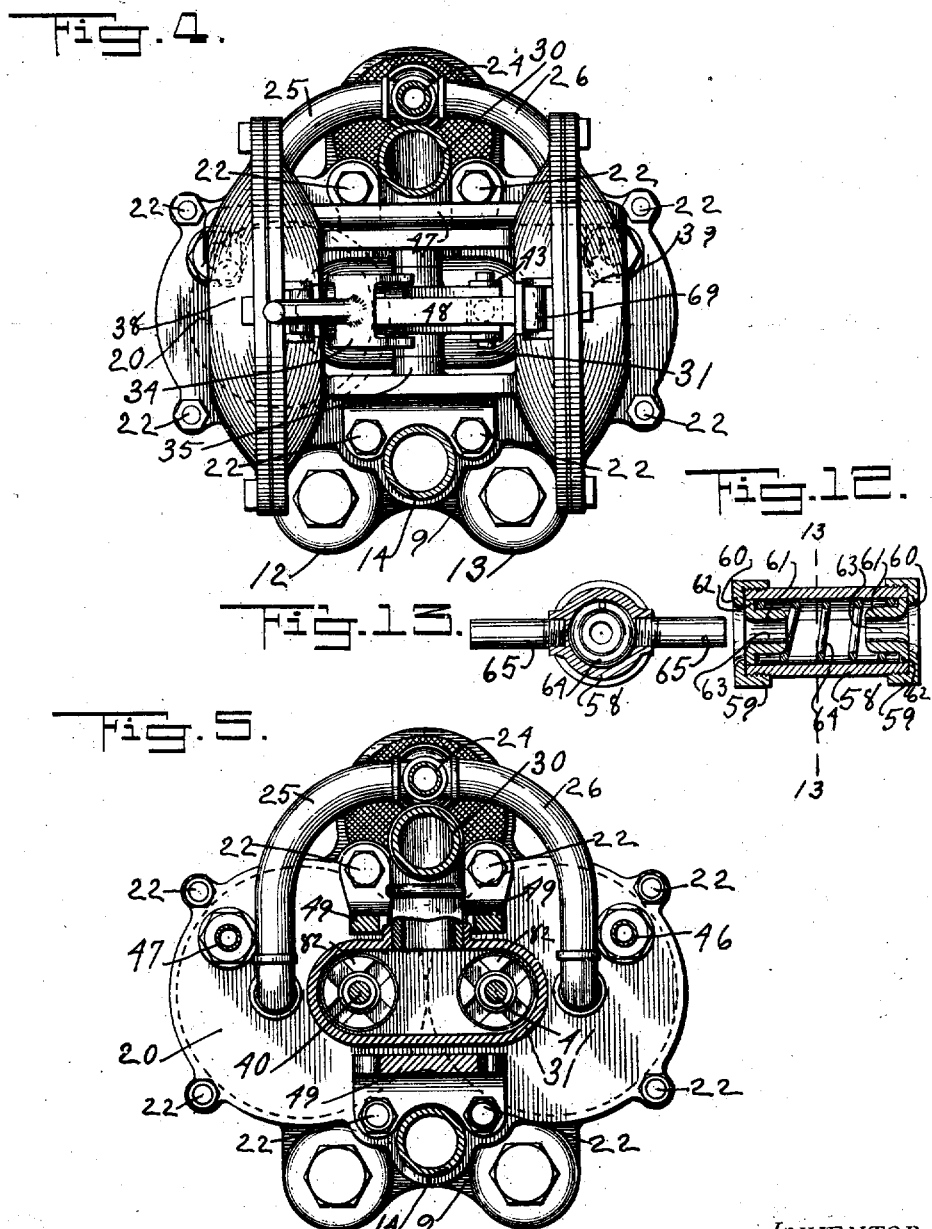

J. M. SWANSTROM.
DEVICE FOR RAISING WATER.
APPLICATION FILED SEPT. 24, 1909.

979,107.

Patented Dec. 20, 1910.
6 SHEETS—SHEET 5.

WITNESSES:
W F Foy Co.
R. N. Flint

INVENTOR
John M. Swanstrom
BY
Attorney

THE NORRIS PETERS CO., WASHINGTON, D. C.

J. M. SWANSTROM.
DEVICE FOR RAISING WATER.
APPLICATION FILED SEPT. 24, 1909.
979,107.
Patented Dec. 20, 1910.
6 SHEETS—SHEET 6.
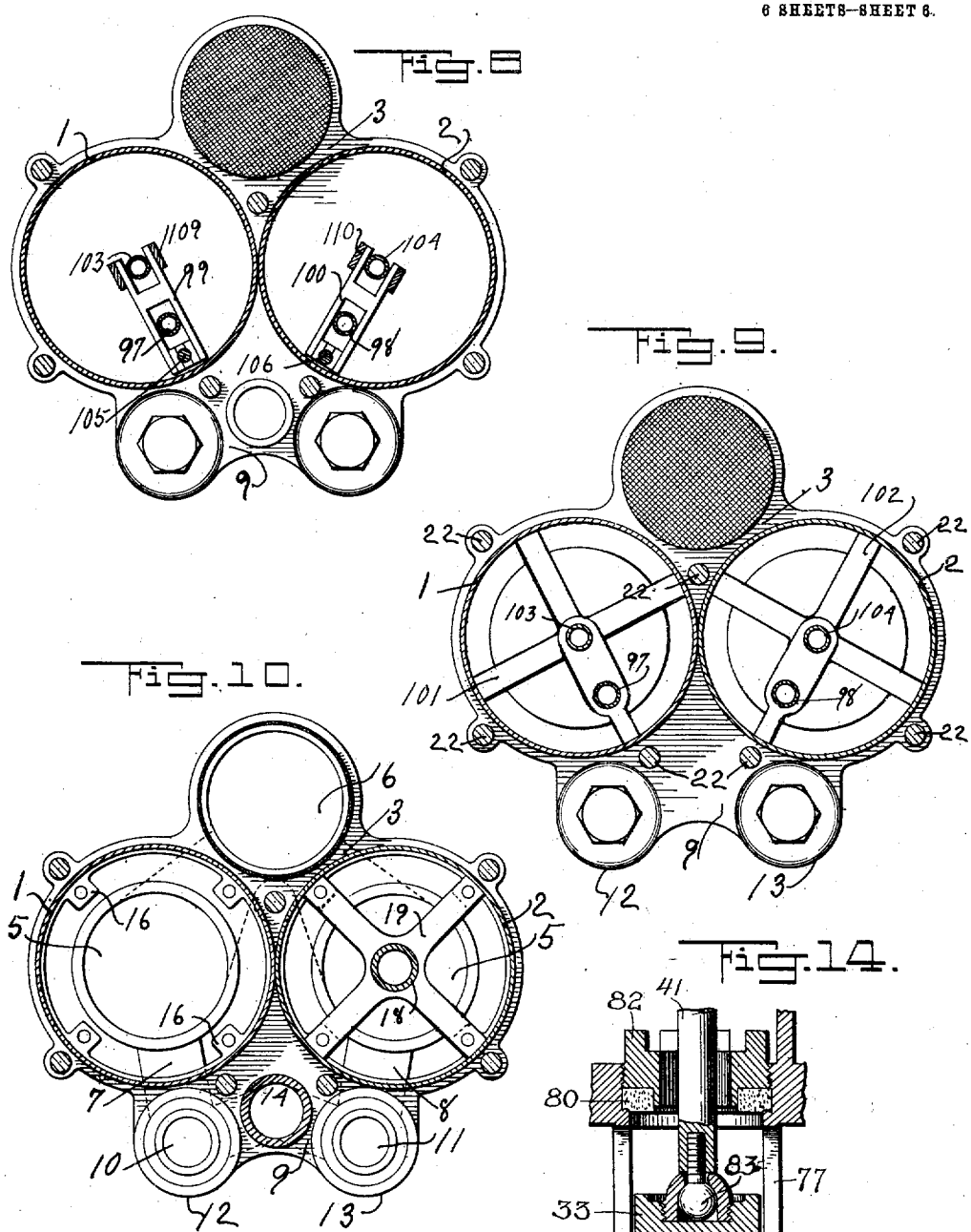
WITNESSES:
INVENTOR
John M. Swanstrom
BY
Attorney

UNITED STATES PATENT OFFICE.

JOHN M. SWANSTROM, OF CHICAGO, ILLINOIS.

DEVICE FOR RAISING WATER.

979,107.  Specification of Letters Patent.  Patented Dec. 20, 1910.

Application filed September 24, 1909. Serial No. 519,397.

*To all whom it may concern:*

Be it known that I, JOHN M. SWANSTROM, a citizen of the United States, residing at Chicago, in the county of Cook, State of Illinois, have invented certain new and useful Improvements in Devices for Raising Water, of which the following is a description, reference being had to the accompanying drawings, forming a part hereof.

My invention relates to devices for raising water by means of compressed air, which devices are commonly referred to as compressed air water elevators, and, more specifically stated, to that type of compressed air water elevating devices wherein the water is forced from an air tight chamber by the pressure exerted upon the surface of the water within such a chamber by means of air supplied thereto under pressure.

The object of my invention is to provide an improved compressed air water elevator of the type above referred to, to which end I have made improvements relating to general structure and other improvements relating to several of the parts of such a device, all as illustrated in the accompanying drawings, described in the following specification, and particularly claimed in the clauses of the concluding claim.

Figure 6:
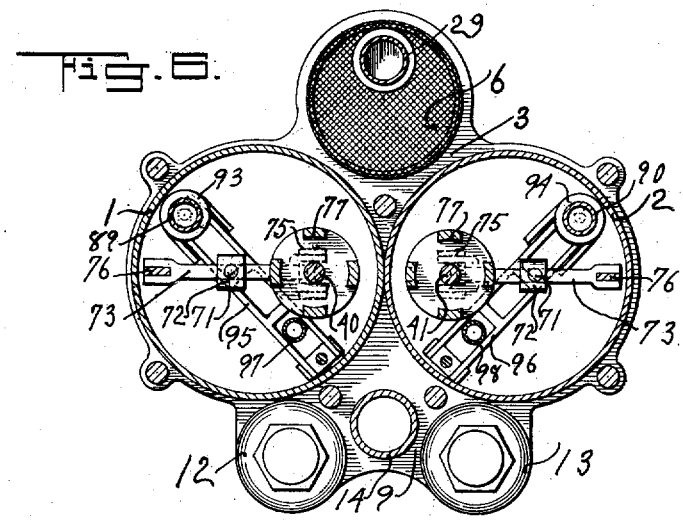
Figure 7:
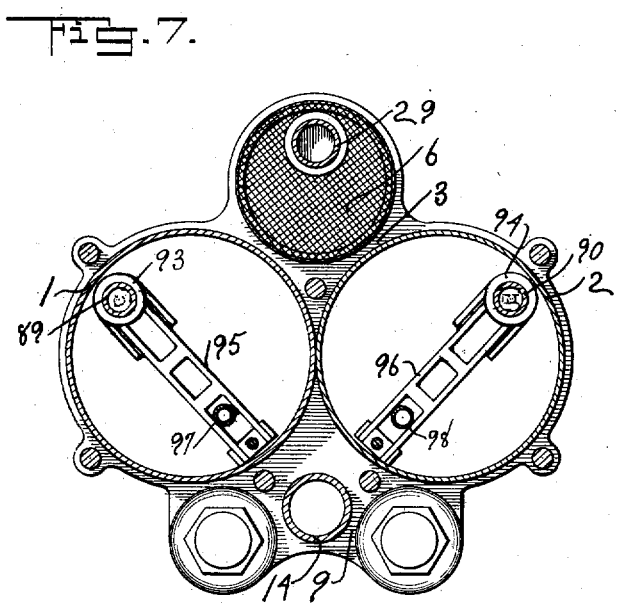

In the drawings: Figure 1 is a view showing my device in front elevation, Fig. 2 is a view showing my device in side elevation, Fig. 3 is a view taken upon a vertical central plane and serving to illustrate the structure and assist in explaining the operation of as many as possible of the elements of my device, some of the parts, however, being shown in elevation in cases where a sectional elevation would tend to confuse. In this view the float mechanism is illustrated upon a central vertical plane, although in the actual device the plane of the float mechanism is disposed at an angle to the central vertical plane, Fig. 4 is a view showing a plan of my device, the supply and discharge pipes for air and water being the only portions shown in section, Fig. 5 is a view showing a section taken upon a horizontal plane indicated by the line 5—5, Fig. 3 looking downward, Fig. 6 is a view showing a section taken upon a horizontal plane indicated by the line 6—6, Fig. 3 looking downward, certain elements located below such plane, however, being omitted for the sake of clearness, Fig. 7 is a view showing a section taken upon a horizontal plane indicated by the line 7—7, Fig. 3, certain elements located below such plane, however, being omitted for the sake of clearness, Fig. 8 is a view showing a section taken upon a horizontal plane indicated by the line 8—8, Fig. 3, certain elements located below such plane, however, being omitted for the sake of clearness, Fig. 9 is a view showing a section taken upon a horizontal plane indicated by the line 9—9, Fig. 3, certain elements located below such plane, however, being omitted for the sake of clearness, Fig. 10 is a view showing a section taken upon a horizontal plane indicated by the line 10—10, Fig. 3, Fig. 11 is a sectional view showing a controlling valve used in my device, Fig. 12 is a view showing an element of my device separately, this view being upon the same plane as Fig. 3; Fig. 13 is a view showing a section of the part shown in Fig. 12 upon a plane indicated by the line 13—13, Fig. 12 and at right angles to the plane of that view; and Fig. 14 is an enlarged sectional view of the exhaust valve of my device.

In the drawings 1 and 2 are two water chambers of any convenient form but shown as of cylindrical form designed to be submerged in or located below the level of the water to be elevated and into which chambers the water flows and from which chambers the water is forced by means of compressed air supplied to the interior of the chambers.

3 is a base upon which said chambers are supported, annular grooves being provided at 4 to receive the lower ends of the chambers 1, 2.

5, 5 are inlet ports controlled by suitable valves and communicating with a single inlet opening 6 through which the water enters both chambers 1, 2. The water in leaving the chambers 1, 2 passes downward through ports 7, 8 into a discharge valve casing 9 and upward through ports 10, 11, controlled by discharge valves of common form located in valve chambers 12, 13, whereupon the streams from the two chambers mingle and continue upward through a single discharge pipe 14. Coöperating with the inlet ports 5, 5 are inlet valves 15, one for each water chamber, and 16 are guides formed with the base 3 and acting to guide the periphery of the valves 15. The valves 15 have each also a central guide or stem 17 projecting upwardly therefrom, and which stem moves within a tubular guide 18 formed in one piece with a spider 19 secured upon the upper ends of the guides 16, which spider serves as a stop for limiting the upward movement of the inlet valves 15. The outer surface of the tubular guide 18 forms a guide for the lower end of a float as will be hereinafter explained.

20 is an upper head for the water chambers 1, 2 having annular grooves 21 upon its under side into which the upper ends of the water chambers enter. The upper head 20 and the base 3 are secured together, and the water chambers 1, 2 thus secured in position, by means of bolts 22 passing through the upper head and into lugs 23 upon the base, and the upper head forms a support for the valve operating mechanism of my device.

24 is a pipe through which air under pressure is supplied to my device, this pipe separating into two branches 25, 26 one of which supplies air to each of the chambers 1, 2 and 27 and 28 are upwardly opening valves for controlling the flow of compressed air to the chambers 1, 2.

29 is a dirt trap formed from a piece of pipe and having an opening in line with the vertical air supply pipe 24, so that any dirt passing through the air pipe 24 will pass into the trap 29 instead of passing through the branches 25, 26 and to the air supply valves.
30 is an air exhaust pipe through which air escapes after having forced the water from the chambers 1, 2, which pipe leads from an exhaust valve chamber 31 formed with the upper head 20, and 32, 33 are downwardly opening exhaust valves designed to control the flow of air from the chambers 1, 2.

The valves 27 and 32 of the water chamber 1, and the valves 28 and 33 of the water chamber 2, are operated so as to control the flow of compressed air to and the exhaust from said chambers by means of an oscillating lever 34 pivoted so as to swing about an axis at 35, which lever is operated by flexible diaphragms 36, 37 located in diaphragm chambers 38, 39. The exhaust valves 32, 33 have upwardly extending operating rods 40, 41 which pass through the top wall of the exhaust valve chamber 31, and 42, 43 are link connections connecting the upper ends of said rods with arms of the oscillating lever 34 as shown, and 44 is a weight secured to said oscillating lever for the purpose of insuring the movement of said lever into its extreme positions after it is moved past its middle position as will be understood.

The diaphragm chambers 38, 39 are each formed in two parts between which the diaphragms 36, 37 are clamped, the outer of such parts forming in connection with its diaphragm an air chamber into which compressed air is admitted through pipes 46, 47, and the inner parts of said chambers are connected together by means of guide rails 48 and combined cross braces and supporting standards 49 by means of which the diaphragm chambers and oscillating lever 34 are supported from the upper head 20; the combined cross braces and standards 49, guide rails 48 and the inner parts of the diaphragm chambers being formed as a single unitary and preferably integral member. The standards 49 support the pivot 35 of the oscillating lever as shown, and the standard adjacent the exhaust pipe is shown as bifurcated so as to pass upon either side of such pipe. The standards 49 are provided with horizontally extending bases which rest upon the upper surface of the head 20 and are secured in place by means of the middle ones of the rods 22 which extend through holes in said bases as shown in Fig. 1.

50, 51 are plates in contact with the diaphragms 36, 37 and having stems 52, 53 which pass through guides 54, 55 formed in the inner parts of the diaphragm chambers, these stems having a reciprocatory movement parallel with and between the guide rails 48, and the inner ends of which have tapered portions 56, 57 and shoulders at the base of said tapered portions.

58, Fig. 12, is a reciprocating cylindrical sleeve having heads 59 at each of its ends which move in contact with and are guided by the guide rails 48, which heads have each a ledge 60 projecting over the ends of the sleeve 58.

61 are bushings within the sleeve 58 and having each an outwardly projecting ledge 62 designed to engage the ledge 60 so as to be retained within the sleeve 58, and they have also an opening 63 into which the tapered ends 56, 57 of the stems 52, 53 may enter.

64 is a spring within the sleeve 58, the ends of which are in contact with the ledges 62 and which spring forces the bushings 61 apart and into contact with the ledges 60 of the heads 59.

The oscillating lever 34 is operated by means of compressed air admitted to the diaphragm chambers through the pipes 46, 47, and the purpose of the mechanism above described is to cushion the movement of the parts and prevent violent impact and possible injury to them as the weighted oscillating lever is moved from side to side.

The sleeve 58 is provided with projecting trunnions 65 which enter slots 66 formed in the lever 34 and by means of which construction the lever is operated by the sleeve as will be understood. The lever 34 is bifurcated for a part of its length as shown in

Fig. 4, and a portion thereof extends upon each side of the sleeve 58 and guide rails 48 as shown.

67, 68 are springs the outer ends 69 of which are secured between lugs formed upon the inner parts of the diaphragm chambers 38, 39, and the middle portions of which springs rest against the plates 50, 51 and tend to keep such plates and the diaphragms against which they rest pressed into the outer parts of the diaphragm chambers and to return them to such a position after they have been forced inward by air admitted between the diaphragms and the outer portion of the diaphragm casing.

The compressed air supply and exhaust valves 27 and 32 are both operated from the oscillating lever 34 as stated, to which end the exhaust valve 32 is provided with a depending stem 70 and the supply valve 27 with a depending stem 71. 72 is a stirrup upon the lower end of the stem 71 and having a slot through which a lever 73 extends, the connection between the lever and valve stem being loose and a notch 74 being preferably provided in the lever to receive the lower end of the valve stem. One end of the lever 73 is connected with the stem 70 and the other end by means of links at 75 and the other end thereof is supported from the under side of the head 20 by means of a link 76, the purpose of providing two link connections being to lessen the probability of the parts binding with one another and to secure a loose connection for the air supply valve. A cage 77 and guide 78 is provided for the exhaust valve, and seats 79, 80 of yieldable material are provided for the air supply and exhaust valves, these seats being held in place by a coupling 81 which forms a part of the air supply conduit and by a bushing 82 surrounding the operating rod 40 of the exhaust valve. The exhaust valve 32 and its depending stem are preferably formed in one piece, and a ball and socket connection is preferably provided between the operating rod and the exhaust valve as shown at 83, Fig. 14, in order to secure a proper seating of the valve. It will be understood that the valve operating mechanism such as has been above referred to is used for operating the air supply and exhaust mechanisms of both the water chambers 1, 2, the mechanism in the two chambers being identical, although reference numerals have been applied only to the valve operating mechanism within the chamber 1.

The diaphragms 36, 37 are operated by compressed air from the water chambers 1, 2 which flows to the diaphragm chambers through the pipes 46, 47, and the arrangement of the parts is such that compressed air from the left hand water chamber 1 flows through the pipe 47 and into the right hand diaphragm chamber 39 to operate the diaphragm 37, and vice versa; and the flow of compressed air through the pipes 46, 47 is controlled by valves located in valve chambers 84, 85, which valves are operated by floats 86, 87 within the chambers 1, 2. One of the valves above referred to is shown at 88, Fig. 11, and it will be understood that the two valves are identical in structure.

89, 90 are pipes depending from the under side of the head 20, and which pipes serve as guides for valve rods 91, 92 which operate the valves above referred to and which serve also as supports for stirrups 93, 94 secured to their lower ends. 95, 96 are levers pivotally supported by said stirrups and which are pivotally connected with the lower ends of the valve operating rods 91, 92.

97, 98 are pipes secured to and depending from the under side of the head 20 and serving as guides for the levers 95, 96 and as supports for levers 99, 100 which are pivotally supported near the lower ends thereof. The lower ends of these pipes are provided with spiders 101, 102 which steady their lower ends and serve also as guides for tubes 103, 104 which project upward from the floats 86, 87 as shown. The levers 95, 99 and 96, 100 are pivotally connected together by means of links 105, 106 and the levers 99, 100 are operated from the floats 86, 87 by means of cross-heads 107, 108 pivotally connected therewith by means of links 109, 110 and through which cross-heads the stems 103, 104 move, collars 111, 112 being provided upon each stem so that the stem may have a limited movement without operating the cross-heads.

The floats 86, 87 are provided with downwardly extending cylindrical guide members 113, 114 which move in contact with the tubular guides 18, and, as the spiders 101, 102 form guides for the tubes 103, 104, it will be seen that two guides separated a considerable distance from one another are provided for each float. The floats are also provided with downwardly extending tubes 115, 116 which surround the guide members and form air chambers 117 beneath each float which are open only at their lower ends, the effect of which is to increase the volume of the float members as the water rises about them.

Such being the construction of my device, the operation thereof will be understood from the following explanation. Referring to Fig. 3, the right hand water chamber 2 is shown as empty and the parts within the chamber in the position they assume as the last of the water is driven from the chamber, the position of the supply and exhaust valves being still the same as during the time that water has been flowing from the chamber under the influence of air under pressure entering the chamber, so that the air within the chamber is under pressure.

The float 87 has fallen as the last of the water leaves the chamber 2 and in so doing has opened the controlling valve within the valve chamber 85 to thereby permit air under pressure to flow from within the water chamber 2 through the pipe 46 and into the outer end of the left hand diaphragm chamber 38. The air under pressure will force the diaphragm 36 out of the diaphragm chamber 38, or to the right, and the movement of said diaphragm will throw the lever 34 past its middle position when it will fall under the influence of the weight 44 into a position the reverse of that shown, which movement will operate the valves 28, 33 through the connection disclosed, the supply valve 28 being closed and the exhaust valve 33 opened during the movement of the lever referred to. As soon as the exhaust valve 33 is opened and the supply valve 28 closed the pressure of air within the chamber 2 will fall and water will begin to enter the chamber 2 through the valve 15 thereof, and, before the float 87 begins to rise with the entering water the spring 67 will return the diaphragm 36 into the diaphragm chamber 38, or move it to the left, the air from the chamber 38 flowing back through the pipe 46 and into the chamber 2, the exhaust valve 33 of which is open as explained.

The right hand chamber 1 is shown with the water entering thereinto, and it may be explained that the water finally reaches a considerably higher level than the level indicated in Fig. 3. When the movement of the oscillating lever 34 above referred to takes place the exhaust valve 32 of the chamber 1 will be closed and the supply valve 27 thereof opened, thus admitting air under pressure to the chamber 1 thereby arresting the flow of water thereinto and permitting the inlet valve 15 of that chamber to close, whereupon the water within such chamber will begin to flow therefrom under the influence of the air under pressure flowing thereinto.

The design and proportion of the several parts of my device, and the location thereof with reference to the head or level of the source of supply will be such that as one chamber becomes empty the other will have become full or substantially full of water, and, as will be understood, it is an empty condition of a water chamber that brings about the movements of the various valves concerned in the operation of my device.

Having thus described my invention and explained the mode of operation thereof, I claim and desire to secure by Letters Patent:

1. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, a spring carried by said lever and through which movements of said diaphragm are communicated to said lever, and means whereby movement of said lever is transmitted to said supply and exhaust valves; a conduit leading from within each water chamber and adapted to conduct air under pressure from the interior of the chamber from which it leads to one of said diaphragm chambers and which conduits constitute the sole connecting means through which fluid may flow with which said chambers are provided; a valve for each of said conduits and adapted to control the flow of air therethrough; a float within each water chamber; and lever mechanism interposed between each of said floats and one of said controlling valves and through which said valve is operated.

2. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, an oscillating lever, a sleeve movable with and adapted to operate said lever, a guide for said sleeve, a spring located within said sleeve, bushings within said sleeve and in contact with the ends of said spring, a stem for each of said diaphragms and adapted to be operated thereby and to engage said bushings and transmit motion of said diaphragms to said lever through said spring, and means whereby movement of said oscillating lever is transmitted to said supply and exhaust valves; a conduit leading from within each water chamber and adapted to conduct air under pressure from the interior of the chamber from which it leads to one of said diaphragm chambers; a valve for each of said conduits and adapted to control the flow of air therethrough; a float within each water chamber; and lever mechanism interposed between each of said floats and one of said controlling valves and through which said valve is operated.

3. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber, a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, means whereby movement of said lever is transmitted to said supply and exhaust valves, a stem for each of said diaphragms and adapted to be operated thereby and to operate said oscillating lever, and a spring carried by and movable with said oscillating lever and through which movement of said stems is transmitted to said lever; a conduit leading from within each water chamber and adapted to conduct air under pressure from the interior of the chamber from which it leads to one of said diaphragm chambers; a valve for each of said conduits and adapted to control the flow of air therethrough; a float within each water chamber; and lever mechanism interposed between each of said floats and one of said controlling valves and through which said valve is operated.

4. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, an oscillating lever, a sleeve movable with and adapted to operate said lever, a guide for said sleeve, a spring located within said sleeve, bushings within said sleeve and in contact with the ends of said spring, a stem for each of said diaphragms and adapted to be operated thereby and to engage said bushings and transmit motion of said diaphragms to said lever through said spring, means whereby movement of said oscillating lever is transmitted to said supply and exhaust valves; and a spring carried by each of said diaphragm chambers and in operative engagement with the diaphragm thereof and adapted to yield as the diaphragm is moved by air under pressure and to return the diaphragm to its initial position; a conduit leading from within each water chamber and adapted to conduct air under pressure from the interior of the chamber from which it leads to one of said diaphragm chambers; a valve for each of said conduits and adapted to control the flow of air therethrough; a float within each water chamber; and lever mechanism interposed between each of said floats and one of said controlling valves and through which said valve is operated.

5. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, means whereby movement of said lever is transmitted to said supply and exhaust valves, a stem for each of said diaphragms and adapted to be operated thereby and to operate said oscillating lever, a spring carried by and movable with said oscillating lever and through which movement of said stems is transmitted to said lever; and a spring carried by each of said diaphragm chambers and in operative engagement with the diaphragm thereof and adapted to yield as the diaphragm is moved by air under pressure and to return the diaphragm to its initial position; a conduit leading from within each water chamber and adapted to conduct air under pressure from the interior of the chamber from which it leads to one of said diaphragm chambers; a valve for each of said conduits and adapted to control the flow of air therethrough; a float within each water chamber; and lever mechanism interposed between each of said floats and one of said controlling valves and through which said valve is operated.

6. In a device of the class described, two water chambers; a head for closing the upper ends of said chambers; a valve controlled inlet passage for each chamber and through which water may enter thereinto; a valve controlled outlet passage for each chamber and through which water is discharged therefrom; a supply passage for air under pressure leading through said head and into each water chamber; an upwardly opening reciprocating supply valve for controlling the flow of air therethrough; an exhaust passage leading from each of said chambers through said head; a downwardly opening reciprocating exhaust valve for controlling the flow of air therethrough; a lever within each water chamber and pivotally supported from said head; means connecting the lever of each chamber with the supply and exhaust valves thereof; an operating rod connected with each of said exhaust valves and extending upwardly through said head; an oscillating lever supported by said head and operatively connected with both said operating rods; mechanism adapted to be operated by air under pressure for operating said oscillating lever and comprising two chambers each having a movable wall adapted to be moved by air under pressure; a conduit leading from within each water chamber and adapted to conduct air under pressure from the interior of each water chamber to one of the chambers of said lever operating mechanism and which conduits constitute the sole connecting means through which fluid may flow with which the chambers of said valve operating mechanism are provided; a valve for each of said conduits and adapted to control the flow of air therethrough; a float within each water chamber; and lever mechanism interposed between each of said floats and one of said controlling valves and through which said valve is operated.

7. In a device of the class described, two water chambers; an inlet passage for each chamber and through which water may enter thereinto; a valve for said inlet passage; a spider located over said valve and having an upwardly extending guide; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism adapted to be operated by air under pressure for operating the supply and exhaust valves of both of said chambers; a conduit leading from within each water chamber and adapted to conduct air under pressure from the interior of each chamber to said valve operating mechanism; a valve for each of said conduits and adapted to control the flow of air therethrough; a float within each chamber and each float having a depending guide member adapted to engage the guide aforesaid of said spider, and a second upwardly extending guide member; a second guide for said second guide member, a crosshead through which said second guide member reciprocates; collars carried by said second guide member and adapted to engage said crosshead; and lever mechanism interposed between each of said crossheads and one of said controlling valves and through which said valve is operated.

8. In a device of the class described, two water chambers; an inlet passage for each chamber and through which water may enter thereinto; a valve for said inlet passage; a spider located over said valve and having an upwardly extending guide; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism adapted to be operated by air under pressure for operating the supply and exhaust valves of both of said chambers; a conduit leading from within each water chamber and adapted to conduct air under pressure from the interior of each chamber to said valve operating mechanism; a valve for each of said conduits and adapted to control the flow of air therethrough; a float within each chamber and each float having a depending guide member adapted to engage the guide aforesaid of said spider, and a second upwardly extending guide member; a second guide for said second guide member, and lever mechanism interposed between each of said floats and one of said controlling valves and through which said valve is operated.

9. In a device of the class described, two water chambers; an inlet passage for each chamber and through which water may enter thereinto; a valve for said inlet passage; a spider located over said valve and having an upwardly extending guide; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism adapted to be operated by air under pressure for operating the supply and exhaust valves of both of said chambers; a conduit leading from within each water chamber and adapted to conduct air under pressure from the interior of each chamber to said valve operating mechanism; a valve for each of said conduits and adapted to control the flow of air therethrough; a float within each chamber and each float having a depending guide member adapted to engage the guide aforesaid of said spider, and having also a depending tube surrounding said guide to thereby form an air chamber between said guide and tube and open at its bottom; and a second upwardly extending guide member; a second guide for said second guide member, and lever mechanism interposed between each of said floats and one of said controlling valves and through which said valve is operated.

10. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, means whereby movement of said diaphragms, and means whereby movement of said lever is transmitted to said supply and exhaust valves; a conduit leading into each of said diaphragm chambers and adapted to conduct air under pressure to each of said diaphragm chambers and which conduits constitute the sole connecting means through which fluid may flow with which said chambers are provided; a valve for controlling the flow of air through each of said conduits; a float within each water chamber; and lever mechanism interposed between each of said floats and one of said controlling valves and through which said valve is operated.

11. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, an oscillating lever, a sleeve movable with and adapted to operate said lever, a guide for said sleeve, a spring located within said sleeve, bushings within said sleeve and in contact with the ends of said spring, a stem for each of said diaphragms and adapted to be operated thereby and to engage said bushings and transmit motion of said diaphragms to said lever through said spring, and means whereby movement of said oscillating lever is transmitted to said supply and exhaust valves; a conduit leading into each of said diaphragm chambers and adapted to conduct air under pressure to each of said diaphragm chambers; a valve for controlling the flow of air through each of said conduits; a float within each water chamber; and lever mechanism interposed between each of said floats and one of said controlling valves and through which said valve is operated.

12. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, means whereby movement of said lever is transmitted to said supply and exhaust valves, a stem for each of said diaphragms and adapted to be operated sure, a vertically arranged oscillating lever and a spring carried by and movable with said oscillating lever and through which movement of said stems is transmitted to said lever; a conduit leading into each of said diaphragm chambers and adapted to conduct air under pressure to each of said diaphragm chambers; a valve for controlling the flow of air through each of said conduits; a float within each water chamber; and lever mechanism interposed between each of said floats and one of said controlling valves and through which said valve is operated.

13. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, an oscillating lever, a sleeve movable with and adapted to operate said lever, a guide for said sleeve, a spring located within said sleeve, bushings within said sleeve and in contact with the ends of said spring, a stem for each of said diaphragms and adapted to be operated thereby and to engage said bushings and transmit motion of said diaphragms to said lever through said spring, means whereby movement of said oscillating lever is transmitted to said supply and exhaust valves, and a spring carried by each of said diaphragm chambers and in operative engagement with the diaphragm thereof and adapted to yield as the diaphragm is moved by air under pressure and to return the diaphragm to its initial position; a conduit leading into each of said diaphragm chambers and adapted to conduct air under pressure to each of said diaphragm chambers; a valve for controlling the flow of air through each of said conduits; a float within each water chamber; and lever mechanism interposed between each of said floats and one of said controlling valves and through which said valve is operated.

14. In a device of the class described, two water chambers; a valve controlled inlet passage for each chamber and through which water may enter thereinto; a valve controlled outlet passage for each chamber and through which water is discharged therefrom; a supply passage for air under pressure leading into each water chamber; an exhaust passage leading from each water chamber; a supply and an exhaust valve for each water chamber and adapted to control the flow of air thereto and therefrom; valve operating mechanism for operating the supply and exhaust valves of both of said chambers and comprising two diaphragm chambers each having a flexible diaphragm adapted to be operated by air under pressure, a vertically arranged oscillating lever pivoted at its lower end and having a weight at its upper end, means whereby movement of said lever is transmitted to said supply and exhaust valves, a stem for each of said diaphragms and adapted to be operated thereby and to operate said oscillating lever, a spring carried by and movable with said oscillating lever and through which movement of said stems is transmitted to said lever, and a spring carried by each of said diaphragm chambers and in operative engagement with the diaphragm thereof and adapted to yield as the diaphragm is moved by air under pressure and to return the diaphragm to its initial position; a conduit leading into each of said diaphragm chambers and adapted to conduct air under pressure to each of said diaphragm chambers; a valve for controlling the flow of air through each of said conduits; a float within each water chamber; and lever mechanism interposed between each of said floats and one of said controlling valves and through which said valve is operated.

15. In a device of the class described, valve operating mechanism comprising two vertically arranged diaphragm chambers each of which chambers is made in two parts; two vertically arranged diaphragms secured one between the two parts of each of said diaphragm chambers; a support operatively connected with the inner parts of both of said diaphragm chambers so that said support and the inner parts of said chambers constitute a single unitary structure; a vertically arranged oscillating lever the lower end of which is pivotally connected with said support and the upper end of which carries a weight, the said lever being located between said diaphragm chambers; means whereby movement of said diaphragms is transmitted to said lever; a plurality of valves operated by said lever; a conduit leading into each of said diaphragm chambers and through which air under pressure may flow to each of said chambers; a valve for controlling the flow of air through said conduits; and a float for operating each of said controlling valves.

16. In a device of the class described, valve operating mechanism comprising two vertically arranged diaphragm chambers each of which chambers is made in two parts; two vertically arranged diaphragms secured one between the two parts of each of said diaphragm chambers; a support operatively connected with the inner parts of both said diaphragm chambers so that said support and the inner parts of said chambers constitute a single unitary structure; a guide extending between the inner parts of said diaphragm chambers and connected with each of said parts; a reciprocating sleeve guided by said guide; a spring located within said sleeve; an oscillating lever pivotally supported by said support and located between said diaphragm chambers and operatively connected with said sleeve; means whereby movement of said diaphragms is transmitted to said lever through said spring and sleeve; a plurality of valves operated by said lever; a conduit leading into each of said diaphragm chambers and through which air under pressure may flow to each of said chambers; a valve for controlling the flow of air through said conduits; and a float for operating each of said controlling valves.

This specification signed and witnessed this tenth day of September A. D. 1909.

JOHN M. SWANSTROM.

In the presence of—
JULIUS F. SMIETOMKA,
MARIE HAHN.